United States Patent
Hiemer et al.

(10) Patent No.: US 11,964,675 B2
(45) Date of Patent: Apr. 23, 2024

(54) SYSTEM AND METHOD FOR THE SAFE OPERATION OF AN AUTOMATED VEHICLE

(71) Applicant: ZF Friedrichshafen AG, Friedrichshafen (DE)

(72) Inventors: Marcus Hiemer, Meckenbeuren (DE); Sascha Heinrichs-Bartscher, Koblenz (DE); Mark Mohr, Tettnang (DE)

(73) Assignee: ZF FRIEDRICHSHAFEN AG, Friedrichshafen (DE)

( * ) Notice: Subject to any disclaimer, the term of this patent is extended or adjusted under 35 U.S.C. 154(b) by 392 days.

(21) Appl. No.: 17/430,724

(22) PCT Filed: Feb. 10, 2020

(86) PCT No.: PCT/EP2020/053236
§ 371 (c)(1),
(2) Date: Aug. 13, 2021

(87) PCT Pub. No.: WO2020/165058
PCT Pub. Date: Aug. 20, 2020

(65) Prior Publication Data
US 2022/0144313 A1 May 12, 2022

(30) Foreign Application Priority Data
Feb. 15, 2019 (DE) ...................... 10 2019 202 025.9

(51) Int. Cl.
*G05D 1/00* (2024.01)
*B60W 10/18* (2012.01)
(Continued)

(52) U.S. Cl.
CPC ...... *B60W 60/00186* (2020.02); *B60W 10/18* (2013.01); *B60W 10/20* (2013.01);
(Continued)

(58) Field of Classification Search
CPC .......... B60W 60/00186; B60W 10/18; B60W 10/20; B60W 30/09; B60W 50/029;
(Continued)

(56) References Cited

U.S. PATENT DOCUMENTS

| 8,705,527 | B1 | 4/2014 | Addepalli et al. |
| 11,079,753 | B1 * | 8/2021 | Roy ...................... G05D 1/0278 |

(Continued)

FOREIGN PATENT DOCUMENTS

| CN | 100406307 C | * 7/2008 | ............. B60Q 9/008 |
| CN | 102421645 A | 4/2012 | |

(Continued)

OTHER PUBLICATIONS

JP2017055563A.FOR.English. Translate, Toyota Motor Corp (Year: 2017).*

(Continued)

*Primary Examiner* — B M M Hannan
(74) *Attorney, Agent, or Firm* — LEYDIG, VOIT & MAYER, LTD.

(57) ABSTRACT

A system for safely operating an automated vehicle includes a first network including a sensor set comprising a plurality of sensors configured to detect the surroundings of the vehicle. The sensor set is coupled to a high-performance electronic control unit (ECU) configured to process the signals of the sensors for orientation, control, and collision avoidance. The system further includes a secure motion-control ECU redundantly coupled to at least one drive element via at least two control signals for controlling the vehicle. The high-performance ECU is configured to output an object recognition indicator signal for orientation, control, and collision avoidance to the motion-control ECU. The system also includes a second, hierarchical, redundant network for safely operating the vehicle. The motion-control (Continued)

ECU is designed to securely evaluate the signals of a human/remote-machine interface (HMI/RMI), a ground truth sensing device, and a perception-safety ECU for the recognition of an emergency state.

13 Claims, 3 Drawing Sheets

(51) Int. Cl.
| | |
|---|---|
| *B60W 10/20* | (2006.01) |
| *B60W 30/09* | (2012.01) |
| *B60W 50/029* | (2012.01) |
| *B60W 50/14* | (2020.01) |
| *B60W 60/00* | (2020.01) |
| *B60W 50/00* | (2006.01) |

(52) U.S. Cl.
CPC .......... *B60W 30/09* (2013.01); *B60W 50/029* (2013.01); *B60W 50/14* (2013.01); *G05D 1/0077* (2013.01); *B60W 2050/0006* (2013.01); *B60W 2050/0292* (2013.01); *B60W 2050/146* (2013.01); *B60W 2300/15* (2013.01); *B60W 2554/4041* (2020.02)

(58) Field of Classification Search
CPC ......... B60W 50/14; B60W 2050/0006; B60W 2050/0292; B60W 2050/146; B60W 2300/15; B60W 2554/4041; G05D 1/0077; G05D 2201/0201; G05D 2201/0213
USPC .......................................................... 701/23
See application file for complete search history.

(56) References Cited

U.S. PATENT DOCUMENTS

| | | | |
|---|---|---|---|
| 2008/0165029 A1* | 7/2008 | Fu | B60R 21/0134 |
| | | | 340/903 |
| 2010/0007728 A1 | 1/2010 | Strauss et al. | |
| 2012/0065861 A1 | 3/2012 | Hartmann et al. | |
| 2012/0265359 A1 | 10/2012 | Das et al. | |
| 2014/0309806 A1* | 10/2014 | Ricci | H04W 48/04 |
| | | | 701/1 |
| 2014/0310739 A1* | 10/2014 | Ricci | G06F 3/013 |
| | | | 725/75 |
| 2017/0090476 A1 | 3/2017 | Letwin et al. | |
| 2018/0039267 A1* | 2/2018 | Miyake | B60T 7/12 |
| 2018/0136653 A1 | 5/2018 | Tao et al. | |
| 2019/0180467 A1* | 6/2019 | Li | G01S 17/93 |
| 2019/0359225 A1 | 11/2019 | Kanoh et al. | |

FOREIGN PATENT DOCUMENTS

| | | | | |
|---|---|---|---|---|
| CN | 104508724 A | 4/2015 | | |
| CN | 106740874 A | 5/2017 | | |
| CN | 106778907 A | 5/2017 | | |
| CN | 107369326 A | 11/2017 | | |
| CN | 106572630 B | * 5/2020 | ............. | A01B 69/00 |
| DE | 102012102173 A1 | 10/2012 | | |
| DE | 102016212009 A1 | * 1/2018 | ............. | G01C 21/32 |
| JP | 2017055563 A | 3/2017 | | |
| WO | WO 2018154859 A1 | 8/2018 | | |

OTHER PUBLICATIONS

JP2017055563A—Bibliographic data, Toyota Motor Corp. (Year: 2017).*

* cited by examiner

SYSTEM AND METHOD FOR THE SAFE OPERATION OF AN AUTOMATED VEHICLE

CROSS REFERENCE TO RELATED APPLICATIONS

This application is a U.S. National Phase application under 35 U.S.C. § 371 of International Application No. PCT/EP2020/053236, filed on Feb. 10, 2020, and claims benefit to German Patent Application No. DE 10 2019 202 025.9, filed on Feb. 15, 2019. The International Application was published in German on Aug. 20, 2020 as WO 2020/165058 A1 under PCT Article 21(2).

FIELD

The disclosure relates to a system and a method for safely operating an automated vehicle.

BACKGROUND

Highly automated, driverless work machines are used to be able to efficiently process a complex process. In addition to the process task, the vehicle must move in an automated manner across fields, on construction sites, or in depots, for example, and must frequently orient itself. A plurality of sensors is used and processed for this orientation task and for the recognition of the environment for collision avoidance. These data are processed in increasingly more powerful so-called high-performance ECUs. Machine learning methods, such as deep neural networks (DNN), are frequently used for this purpose. The various sensors, ECUs, and other components are coupled via a vehicle network in which signals are transmitted in signal branches (QM) developed only with quality measures. This means that although the signals are ascertained and transmitted at high quality on this path, these signals do not satisfy any safety standard and are also not transmitted particularly securely via the vehicle network with additional measures.

In addition to the movement of the vehicle to fulfill a process task, however, the safety of the vehicle during movements is also to be ensured. In addition to the vehicle network with QM paths, a secure, highly redundant system must therefore be created in order to safely transfer the vehicle into a safe state in an emergency situation or in the event of a failure of the QM network.

Known in the prior art are electrical network architectures (cf. DE 10 2012 102 173 A1), in which a plurality of sensors and actuators is provided with two or more electronic control units (ECUs) for processing data from the sensors and for issuing commands to the actuators and with two or more interface devices for connecting the sensors and actuators to the ECUs and to a communication bus, wherein the interface device software can be reconfigured to modify connectivity.

Better and more flexible use of the sensors and actuators is made possible by such measures, and a certain error tolerance is ensured in the event of an interface device failure.

However, such a system is insufficient to enable safe transfer of the vehicle into a safe state in an emergency situation or in the event of a failure of the onboard network or of important device components.

SUMMARY

In an embodiment, the present disclosure provides a system for safely operating an automated vehicle. The system comprises a first network including a sensor set comprising a plurality of sensors configured to detect the surroundings of the vehicle. The sensor set is coupled to a high-performance electronic control unit (ECU) configured to process the signals of the sensors for orientation, control, and collision avoidance. The system further includes a secure motion-control ECU redundantly coupled to at least one drive element via at least two control signals for controlling the vehicle. The high-performance ECU is configured to output an object recognition indicator signal for orientation, control, and collision avoidance to the motion-control ECU. The system also includes a second, hierarchical, redundant network for safely operating the vehicle. The second network includes an human/remote-machine interface (HMI/RMI) comprising at least one emergency shut-off switching device, a ground truth sensing device configured to determine the position of objects relative to the vehicle, a perception-safety ECU coupled via secure connections to the HMI/RMI, the ground truth sensing device, and at least one radar sensor in order to derive from the transmitted signals a secure collision notification signal, which is supplied to the motion-control ECU via a secure connection. The motion-control ECU is designed to securely evaluate the signals of the HMI/RMI, the ground truth sensing device, and the perception-safety ECU for the recognition of an emergency state in order to control the vehicle redundantly into a safe state via at least two control signals in the event of the recognition of an emergency state.

BRIEF DESCRIPTION OF THE DRAWINGS

Subject matter of the present disclosure will be described in even greater detail below based on the exemplary figures. All features described and/or illustrated herein can be used alone or combined in different combinations. The features and advantages of various embodiments will become apparent by reading the following detailed description with reference to the attached drawings, which illustrate the following.

DETAILED DESCRIPTION

Figure 1:
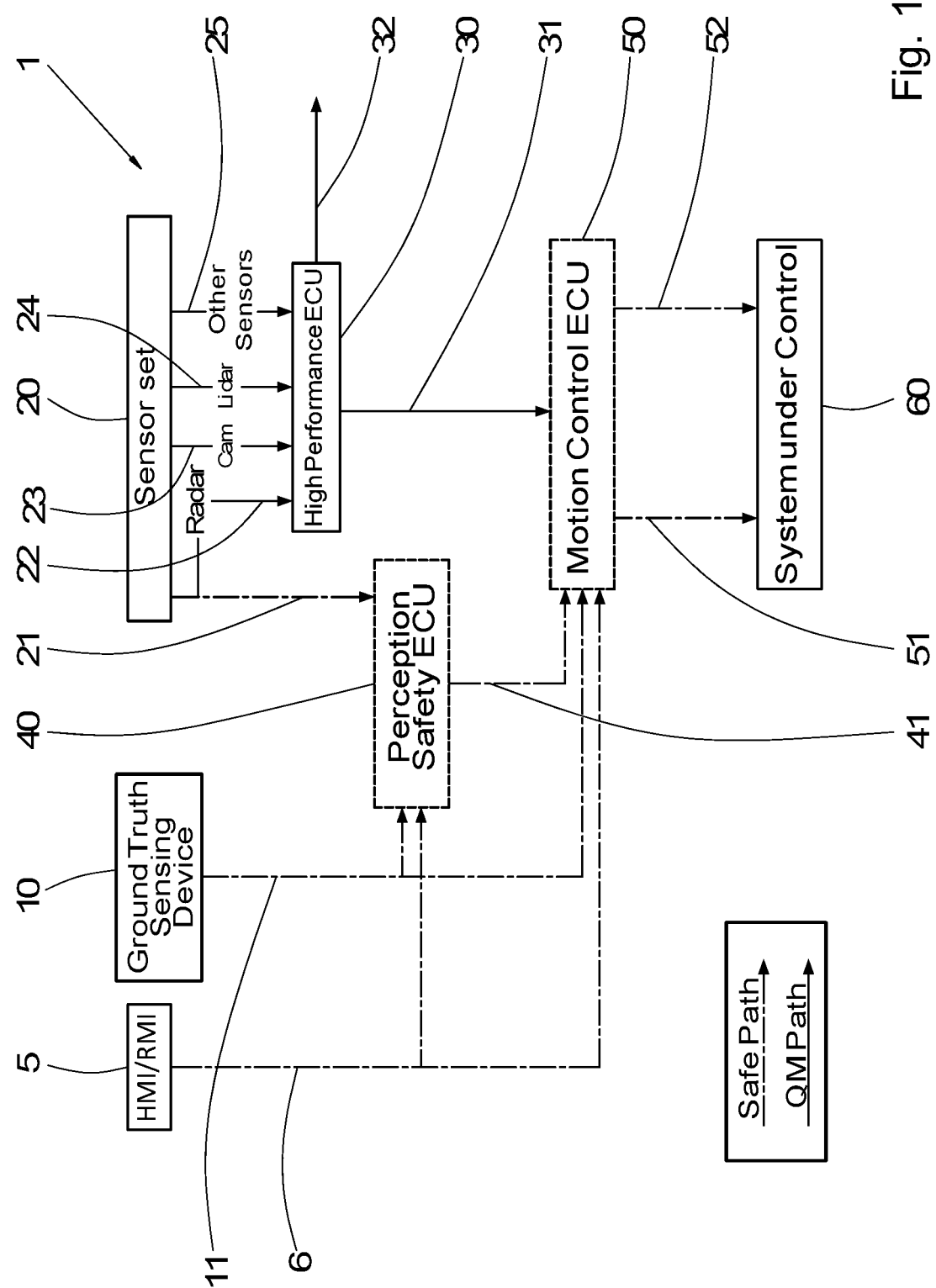
FIG. 1 a block diagram of a first embodiment of a system according to the invention for safely operating an automated vehicle.

The present disclosure specifies a system and a method for safely operating an automated vehicle, in which in the event that an emergency state occurs, for example, due to a risk of collision or in the event of a failure of the onboard network or of individual components thereof, a safe transfer of the vehicle into a safe state is ensured.

For this purpose, the present disclosure describes a hierarchical, highly redundant E/E network (electrical/electronic network) for safely operating an automated vehicle.

The disclosure provides a system for operating an automated vehicle. The system includes (a) a first network comprising a sensor set comprising a plurality of sensors for detecting the surroundings of the vehicle, which sensor set is coupled to a high-performance ECU, which processes the signals of the sensors for orientation, control, and collision avoidance; and a secure motion-control ECU, which is redundantly coupled to at least one actuator via at least two control signals for controlling the vehicle; wherein the high-performance ECU outputs an object recognition indicator signal for orientation, control, and collision avoidance to the motion-control ECU; (b) a second, hierarchical, redundant network for safely operating the vehicle, comprising: an HMI/RMI (human/remote-machine interface) comprising at least one emergency shut-off switching device; a ground truth sensing device for determining the position of objects relative to the vehicle; a perception-safety ECU, in the form of a control device, which is coupled via secure connections to the HMI/RMI, the ground truth sensing device, and at least one radar sensor in order to derive from the transmitted signals a secure collision notification signal which is supplied to the motion-control ECU via a secure connection; wherein the motion-control ECU is designed to safely evaluate the signals of the HMI/RMI, of the ground truth sensing device, and of the perception-safety ECU for the recognition of an emergency state in order to control the vehicle redundantly into a safe state via at least two control signals in the event of the recognition of an emergency state.

According to a further aspect, the disclosure provides a method for safely operating an automated vehicle is disclosed, in which (a) in a first network, a sensor set comprising a plurality of sensors for detecting the surroundings of the vehicle is coupled to a high-performance ECU and the signals of the sensors are processed for orientation, control, and collision avoidance in order to generate an object recognition indicator signal for orientation, control, and collision avoidance, which signal is transmitted to a secure motion-control ECU, which redundantly safely controls via at least two control signals at least one actuator for controlling the vehicle; (b) in a second, hierarchical, redundant network for safely operating the vehicle, an HMI/RMI comprising at least one emergency shut-off switching device; and a ground truth sensing device for determining the position of objects relative to the vehicle; are coupled via secure connections to a perception-safety ECU in the form of a control device, and the perception-safety ECU is furthermore supplied with the signal of at least one radar sensor in order to derive from the transmitted signals a secure collision notification signal, which is supplied to the motion-control ECU via a secure connection; wherein the motion-control ECU evaluates the signals of the HMI/RMI, of the ground truth sensing device, and of the perception-safety ECU in order to safely recognize an emergency state in which the vehicle is redundantly controlled into a safe state via at least two control signals.

The second, hierarchical, redundant E/E network ensures a safe transfer of the vehicle into a safe state in the event of the recognition of an emergency state in that the motion-control ECU redundantly controls the vehicle via at least two control signals.

To this end, a second, hierarchical, redundant E/E network is provided, which is separate from the first vehicle network and in which the motion-control ECU is incorporated via a secure connection.

The motion-control ECU evaluates the safe shutdown signal indicators coming from the HMI/RMI, the ground truth sensing device, and the perception-safety ECU.

The perception-safety ECU evaluates the secure signals of the HMI/RMI and of the ground truth sensing device in order to determine safe position information of higher quality from the input signals. For example, if an emergency shut-off signal is output by the HMI/RMI, the perception-safety ECU switches the output signal to "emergency shut-off" in any event so that the motion-control ECU controls the vehicle in each case redundantly in a safe state via at least two control signals.

For example, if an object in the vicinity of the vehicle is recognized by means of one or more radar signals and this information is confirmed by the ground truth sensing device with the aid of a "time-of-flight camera", this leads to a reliable output signal of the perception-safety ECU via the relative position of the potential object. In this case, the output signal of the perception-safety ECU already contains preprocessed, safe object recognition of the various sensor systems.

From the collision notification signal of the perception-safety ECU and optionally from the shutdown signals of the HMI/RMI and of the ground truth sensing device, the motion-control ECU calculates an emergency driving signal which actuates two redundant signals with which at least one actuator is actuated redundantly for stopping or swerving via at least two control signals. This may be a braking or steering system, wherein a combined braking and steering movement with swerving may also be achieved simultaneously.

According to a further feature, the motion-control ECU is furthermore respectively coupled via a secure connection to the HMI/RMI and to the ground truth sensing device.

In this way, in addition to the collision notification signal of the perception-safety ECU, the motion-control ECU can also directly process the safe output signals of the HMI/RMI and of the ground truth sensing device in order to further increase the safety for the recognition of an emergency state. For example, in this way, an emergency shut-off signal is transmitted from the HMI/RMI directly to the motion-control ECU so that the motion-control ECU can directly initiate the transfer of the vehicle into a safe state.

According to a further embodiment, the HMI/RMI has at least one emergency shut-off switch provided on the vehicle, and at least one remotely controlled emergency shut-off switching device.

In this way, emergency shut-off can be ensured both in a human-controlled manner by operating an emergency shut-off switch on the vehicle and in a remotely controlled manner.

According to a further embodiment, the high-performance ECU is designed to recognize one or more objects in the surroundings of the vehicle from the signals of the sensors of, to classify them, to determine positions and movement information of the objects, and to transmit them to the motion-control ECU as an unsafe object recognition indicator signal, wherein the motion-control ECU is furthermore designed to evaluate the object recognition indicator signal and to compare it to the safe signal of the perception-safety ECU, and optionally of the HMI/RMI and of the ground truth sensing device, in order to control the vehicle via the at least two control signals in accordance with a specified driving task in the event that no emergency state is recognized.

In this way, the high-performance ECU is used to determine a more detailed picture of the surroundings of the vehicle from the sensor signals and to recognize objects or assign them to a class. This can be achieved, for example, by using artificial intelligence (deep learning) algorithms, such as segmentic segmentation. The calculations of the high-performance ECU, which may be very complex and may provide a multi-layered picture of the immediate vehicle surroundings, are thus compared by the motion-control ECU to the secure collision notification signal of the perception-safety ECU in order to effect control of the vehicle in accordance with a specified vehicle task according to the specifications of the high-performance ECU in the event that no emergency state is recognized.

According to a further embodiment, the high-performance ECU has an interface for outputting an output signal, in particular to a human-machine interface, for example in the form of a display.

In this way, the calculated signals of the high-performance ECU with high information content can be used not only for vehicle movement control but also for other tasks, for example, in order to directly inform a user of the surroundings.

According to a further embodiment, the sensor set is a surround sensing sensor set comprising a plurality of sensors, preferably with different measuring principles, in particular with at least one radar sensor, with at least one camera sensor, with at least one lidar sensor, and preferably one or more other sensors, in particular an ultrasonic sensor, and/or an infrared sensor.

In this way, extensive sensor data can be used in order to ensure the most precise detection possible of the vehicle surroundings even with a plurality of measuring principles, so that a particularly high-quality and safe scanning of the vehicle surroundings is made possible.

According to a further embodiment, the ground truth sensing device has a time-of-flight camera and/or a lidar system, in particular for pedestrian recognition, and/or a bumper that triggers a signal upon contact with an object.

The time-of-flight cameras are 3D camera systems that measure distances with the time-of-flight method. According to the photonic mixer device (PMD) sensor used, they are also called PMD cameras and can be used in the focus range of a few decimeters up to approximately 40 m.

Lidar methods are radar-related methods for optical distance and velocity measurement, wherein laser beams are used instead of radar beams. Lidar systems are known in the field of driverless vehicles for obstacle recognition and are also partially standardized in order to avoid accidents with persons who could cross the automatic driving paths.

A bumper that triggers a signal upon contact with an object enables immediate collision recognition.

According to a further embodiment, the signal of the ground truth sensing device and/or of the perception-safety ECU and/or of the HMI/RMI and/or of the motion-control ECU is transmitted redundantly by wire or in a secured manner via a bus system (in particular with alive count or cyclic redundancy check).

A secure signal transmission is on the one hand made possible redundantly by wire, and on the other hand also by means of a bus system that is appropriately secured. This enables a simple and flexible connection.

According to a further embodiment, the perception-safety ECU is designed as a control device that is controlled with software that evaluates the input signals based on rules, without the use of AI algorithms, in order to determine therefrom a secure signal of higher quality with safe position information.

In order to ensure safe processing, the software control takes place based on rules without the use of AI algorithms. A secure collision notification signal is output, the information of which is calculated from input signals, which in turn are all safe.

According to a further embodiment, the system has a human control branch, a level 2 driver assistance perception branch, and a level 4 autonomous driving perception branch, wherein the human control branch has the HMI/RMI, which is coupled to at least the perception-safety ECU via a secure connection; wherein the level 2 driver assistance perception branch has the perception-safety ECU, and at least one radar sensor, and at least one camera, wherein the signals of the radar sensor and the signals of the camera are supplied via a secure connection to a secure fusion unit, which outputs a secure fused signal; wherein the signals of the HMI/RMI, the signals of the fusion unit are supplied via secure connections to the perception-safety ECU and to the motion-control ECU in order to derive therefrom, in the perception-safety ECU, a secure collision notification signal, which is supplied to the motion-control ECU via a secure connection; wherein the level 4 autonomous driving perception branch has the high-performance ECU, which is coupled to the sensor set and is designed to derive from the signals of the sensors an object recognition indicator signal, which is supplied to the motion-control ECU; and wherein the level 2 driver assistance perception branch is designed to control the vehicle via the motion-control ECU into a safe state by means of the secure, fused signal in the event of the recognition of an emergency state or of a failure of the level 4 autonomous driving perception branch.

In this case, the level 4 autonomous driving perception branch with the high-performance ECU serves as a new system portion for autonomous driving. Used as the fallback level for this branch is the level 2 driving assistance perception branch used nowadays as a standard feature in trucks, for example. This level 2 driving assistance perception branch typically consists of a forward-facing radar sensor, the signals of which are fused with the data of a camera. These signals are already safely calculated with very high quality nowadays and are provided with a signal that supplies a picture of the surroundings, so that the motion-control ECU can still transfer the vehicle into a safe state in the event of the recognition of an emergency state.

The modular approach is advantageous in this embodiment: An existing and executable level 2 system can be expanded by a "level 4 system upgrade". As a fallback level in the event of a fault, the level 2 system is briefly capable of providing a picture of the surroundings by means of the merged radar/camera signal so that the motion-control ECU can transfer the vehicle into a safe state.

It goes without saying that the features mentioned above and the features to be explained below can be used not only in the respectively specified combination but also in other combinations or alone, without departing from the scope of the present disclosure.

FIG. 1 shows a first embodiment of a system 1 for operating an automated vehicle.

The system 1 has a first network, which has a high-performance ECU 30 coupled to a sensor set 20 and a motion-control ECU 50. The connections within this network take place via paths that are only secured with quality measures, which, however, are not "secure" or "fail-safe" connections as required for safety-critical tasks. Such "unsecure" connections or paths are referred to below and in the figures as "QM path" and are marked by solid connections in the figures. In contrast, "secure" or "fail-safe" connections, which are required for safety-critical tasks, are generally referred to as "saf path" or "secure connection" in the application and in the figures and are marked by dash-dotted lines in the figures.

The "unsafe" first network, which includes the high-performance ECU 30, the associated sensor set 20, and the motion-control ECU 50, is additionally supplemented by a second, hierarchical, redundant E/E network with secure components and secure connections. The second, redundant network ensures a safe transfer of the vehicle into a safe state independently of the first network with QM paths, i.e., even if the first network should fail or have failed conditions.

The secure connections in the second, hierarchical, redundant network are either of redundant design by means of electrical lines or are designed to be secured via a bus system which is securely designed, for example, by means of alive count or cyclic redundancy check.

Figure 3:
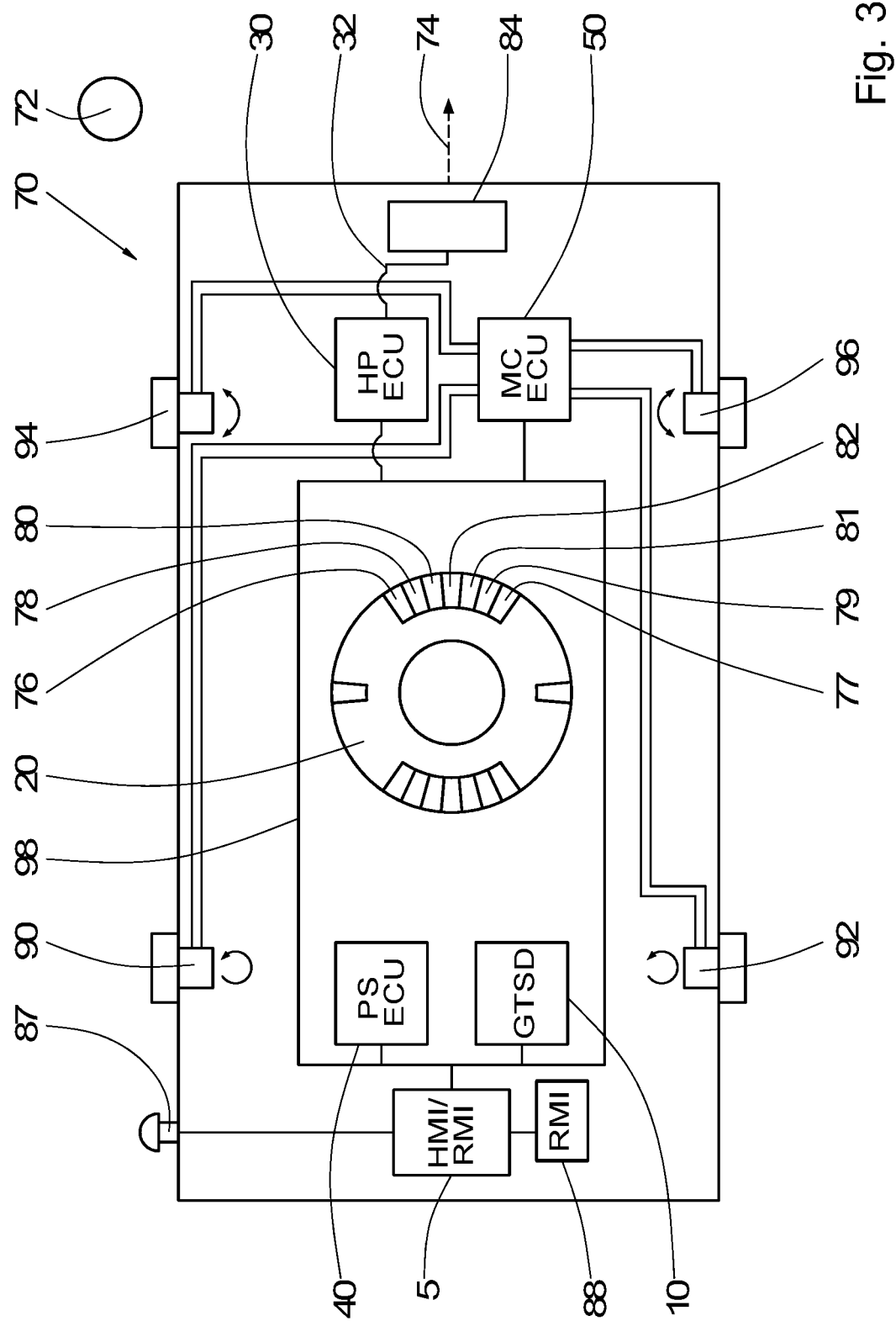
FIG. 3 a simplified representation of a vehicle according to the invention with an object to be detected nearby.

A vehicle 70 that can be operated with such a system 1 is shown by way of example in FIG. 3. It is an automated vehicle, which is provided with two driven wheels 90, 92 and with two steered wheels 94, 96. The vehicle 70 is operated by means of the system 1. The vehicle 70 can be designed, for example, as an agricultural utility vehicle.

The sensor set 20 according to FIG. 1 or FIG. 3 is designed as a surround sensing sensor set, comprising a plurality of sensors with different measuring principles. In this respect, FIG. 3 shows two camera sensors 76, 77, one lidar sensor 82, two radar sensors 80, 81, and two other sensors 78, 79, which may in particular be ultrasonic sensors and/or infrared sensors.

In FIG. 1, the signals of the sensors are denoted. These are a radar signal 22, a camera signal 23, a lidar signal 24, and signals 25 from other sensors. These signals 22-25 are supplied to the high-performance ECU 30. From the signals 22, 23, 24, 25, the high-performance ECU 30 calculates a picture of the surroundings of the vehicle 70 and can recognize objects (cf. 72 according to FIG. 3) but on the one hand also assign them to a class. This can be achieved by using artificial intelligence (deep learning) algorithms, such as segmentic segmentation. The high-performance ECU 30 generally also contains auxiliary computers, such as graphical processors, etc. As a consequence of the high data volume of the input signals and the computing capacity, the high-performance ECU 30 can perform very complex calculations, which serve to evaluate the surroundings of the vehicle 70, with the aid of which objects 72 can be recognized and classified. The output signal of the high-performance ECU 30 is supplied to the motion-control ECU 50 as an unsafe object recognition indicator signal 31.

The output signals of the high-performance ECU 30 can be used not only for vehicle movement control via the motion-control ECU 50 but can also be provided to other receivers, as shown, for example, in FIG. 1 by means of path 32. This could be, for example, a human-machine interface 84, for example in the form of a display, as shown by way of example in FIG. 3.

The motion-control ECU 50 converts the object recognition indicator signal of the high-performance ECU 30 and calculates therefrom redundant control signals 51, 52, which are redundantly supplied to assigned actuators in order to thus control the vehicle 70 in accordance with a specified driving task, as shown by way of example at 60.

The first network, which includes the high-performance ECU 30, the sensor set 20, the motion-control ECU 50, and the associated control signals 51, 52 with which the system 60 is controlled, is also supplemented by the hierarchical, highly redundant E/E network, which in FIG. 1 is coupled via secure connections (safe path) in accordance with the dash-dotted path (the motion-control ECU 50 with the associated control signals 51, 52 is in this case to be assigned to both networks).

An HMI/RMI (human/remote-machine interface) 5 is provided for this purpose. This is at least one emergency shut-off switch (cf. FIG. 3, numeral 87), which is accommodated directly on the vehicle 70 and can be operated by a user. In addition, the HMI/RMI 5 has a remotely controlled remote shut-off switch 88. The latter can be transmitted by a human user or in a remotely controlled manner by a higher-level system via a secure connection. It goes without saying that both the emergency shut-off switch 87 and the remotely controlled remote shut-off switch 88 are coupled to the HMI/RMI via secure connections. The HMI/RMI 5 outputs an external control signal 6, which is supplied to the motion-control ECU 50 via a secure connection, e.g., via a redundant cable connection, for example using a digital input of the motion-control ECU 50. Furthermore, the external control signal 6 of the HMI/RMI 5 is likewise supplied to a perception-safety ECU 40 via a secure connection.

The redundant secure network furthermore contains a ground truth sensing device 10, which outputs a ground truth sensing indicator signal 11, which is respectively supplied via a secure connection to the motion-control ECU 50 and the perception-safety ECU 40.

The ground truth sensing device 10 is a measuring device with which, under normal conditions, the position of an object 72 relative to the vehicle 70 can be safely determined. This can be, for example, a time-of-flight (TOF) camera. A TOF camera is a 3D camera system that can measure distances using the time-of-flight (TOF) method.

Alternatively or additionally, the ground truth sensing device 10 may have a lidar system. Lidar systems are partially already available certified, e.g., for pedestrian recognition. In addition, the ground truth sensing device can have, for example, a bumper that triggers a signal upon contact with an object.

The ground truth sensing device 10 supplies a ground truth indicator signal 11 as output signal 11, with which the position of an object 72 relative to the vehicle 70 can be safely determined. The signal 11 is transmitted either redundantly by wire or via a secured bus system to the motion-control ECU 50 and to the perception-safety ECU 40.

In addition to the external control signal 6 of the HMI/RMI 5 and in addition to the ground truth indicator signal 11 of the ground truth sensing device 10, the perception-safety ECU 40 is also supplied with the signal 21 of at least one radar sensor, which is transmitted redundantly or in a secured manner. The at least one radar sensor or the plurality of radar sensors, which can be part of the sensor set 20, can already be preprocessed by software programs in the sensor control device and can contain finished "radar objects". However, they may also contain raw data that are first processed in the perception-safety ECU 40. While the signal of the at least one radar sensor 21 is transmitted securely to the perception-safety ECU 40, the signals of the radar sensors of the sensor set 20 supplied to the high-performance ECU 30 do not have to be transmitted securely or redundantly. These radar signals 22 may be supersets, subsets, or disjoint sets of the radar signals 21 supplied to the perception-safety ECU 40.

The perception-safety ECU is a control device that combines by means of a software program based on rules, without the aid of AI algorithms, the signals transmitted by the HMI/RMI 5, the ground truth sensing device 10, and the at least one radar sensor and calculates therefrom a secure collision notification signal 41, which is transmitted securely to the motion-control ECU 50. The perception-safety ECU 40 is provided to determine safe position information of higher quality from the secure input signals 6, 11, 21:

For example, if a plurality of radar signals 21 recognize an object 72 in the surroundings and the ground truth sensing device confirms this information by means of the TOF camera or by means of a lidar, the collision notification signal 41 contains a reliable signal about the position of the potential object 72.

In another example, if a different ground truth indicator signal 11, such as the response of a normally open switch in a "bumper", and distance information from a radar signal 21 simultaneously measure a very close object, the information is thereby confirmed and is thus more reliable. In this way, it can be ruled out that, for example, the normally open bumper contact inadvertently closed briefly due to a vibration, for example.

For example, in a third example, if an emergency shut-off signal 6 is generated in a remotely controlled manner via the HMI/RMI 5, the perception-safety ECU in any case switches the collision notification signal 41 to "emergency shut-off", which is converted by the motion-control ECU 50 into a corresponding emergency driving signal.

The motion-control ECU 50 evaluates the secure shut-down signal indicators 6, 11, 41, which are securely transmitted by the HMI/RMI 5, the ground truth sensing device 10, and the perception-safety ECU 40. In this case, the secure collision notification signal 41 from the perception-safety ECU includes an already preprocessed, safe object recognition of various sensor systems. In the event of the recognition of an emergency situation, an emergency driving signal is calculated from the shutdown signals 6, 11, 41 and actuates two redundant signals 51, 52 with which assigned actuators are actuated redundantly in order to stop and/or swerve the vehicle 70.

FIG. 3 shows, by way of example, assigned drive wheels 90, 92 and assigned steered wheels 94, 96, which are actuated via redundant, wired connections by the motion-control ECU 50 in order to initiate a stopping and/or swerving operation in the event of an emergency driving signal. Depending on the driving situation and emergency driving signal, a braking system can, for example, be actuated redundantly or a steering system can be actuated redundantly for swerving. A braking and a steering system can also simultaneously be actuated redundantly in this case so that braking combined with swerving is achieved.

In addition, the motion-control ECU 50 evaluates the unsafe object recognition indicator signal 31 of the high-performance ECU 30 with high information content and controls the at least two redundant output signals 51, 52 in such a way that the vehicle 70 is controlled in accordance with a specified driving task according to the specifications of the high-performance ECU 30 in the event that no emergency state is recognized.

A complex, specified driving task without an emergency state could, for example, be following a swath in a meadow. A swath is then recognized, for example, by means of two cameras, the signals 23 of which are processed in the high-performance ECU 30 by means of a deep learning algorithm. The high-performance ECU 30 calculates complex surroundings information therefrom and sends it in the signal 31 to the motion-control ECU 50. The latter controls the steering via one of the signals 51 and/or 52 such that the vehicle 70 follows the recognized swath.

FIG. 3 shows, by way of example, the system 1 previously described with reference to FIG. 1, in a simplified manner on an automated vehicle 70, which moves along a path 74. In this case, a display 84 is additionally shown, which is actuated by the high-performance ECU 30 via an assigned output 32 in order to display various control information, and optionally a calculated picture of the vehicle surroundings, to any user of the vehicle. Shown here by way of example is a secure bus system 98, which enables a secured transmission by means of alive count or cyclic redundancy check, for example. The HMI/RMI 5, the performance-safety ECU 40, the ground truth sensing device 10, the high-performance ECU 30, and the motion-control ECU 50 can be coupled via this secure bus system 98. Alternatively, of course, a redundant wired connection may also be provided in each case.

Figure 2:
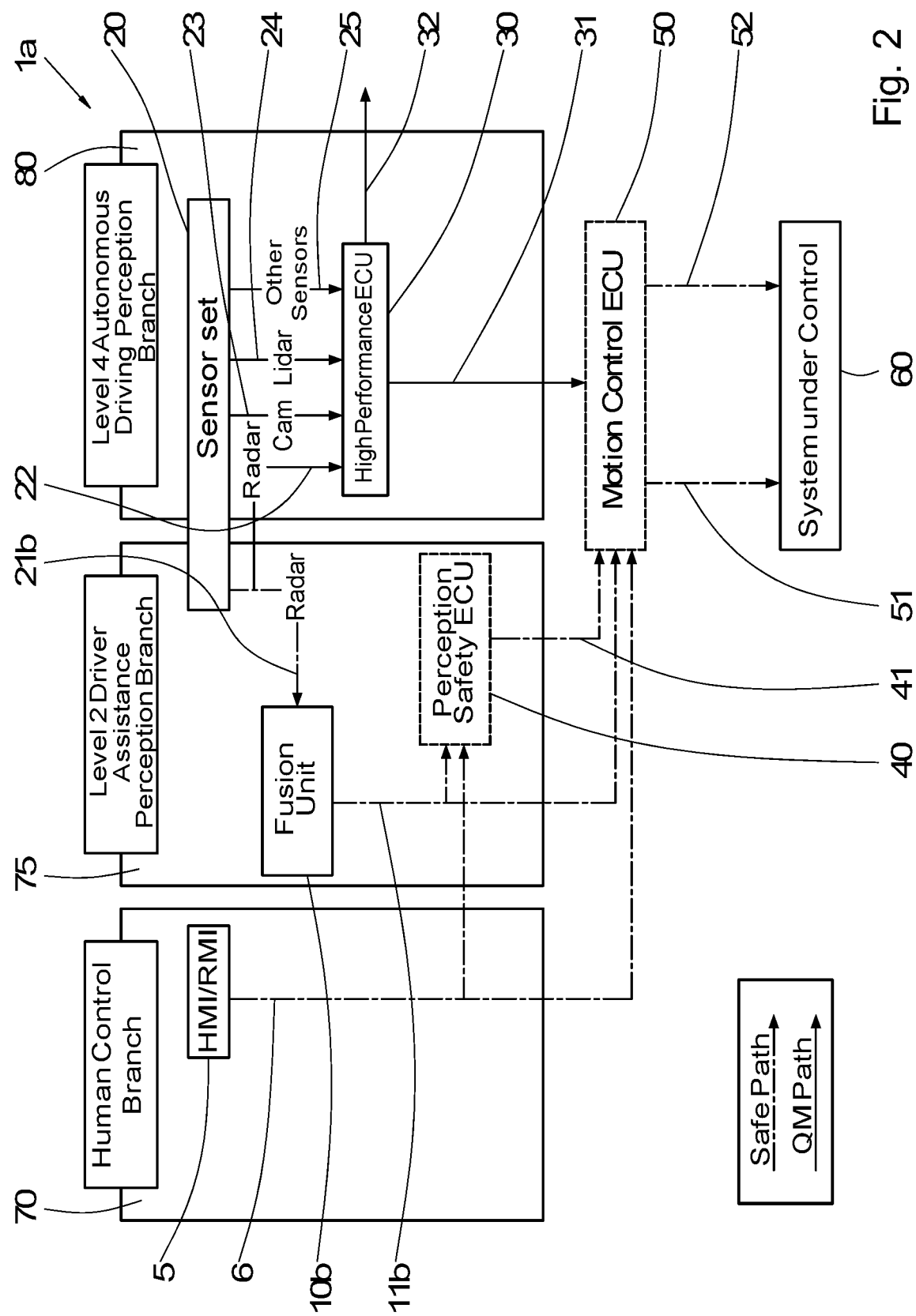
FIG. 2 a block diagram of a further system according to the invention comprising a level 2 driving assistance perception branch and a level 4 autonomous driving perception branch.

With reference to FIG. 2, a preferred modification of the system, which is designated as a whole by numeral 1a, is explained below. In this case, corresponding reference numerals are used for corresponding parts.

The system 1a has a level 4 autonomous driving perception branch 80, which comprises the sensor set 20 and the high-performance ECU 30. As a fallback level for this branch, a level 2 driving assistance perception branch 75 is provided.

Such L2 systems are already used nowadays as a standard feature in trucks, for example. Such a level 2 driving assistance perception branch 75 typically has a forward-facing radar sensor as well as at least one camera. The output signals 21b of the radar sensor and of the camera are fused in a fusion unit 10b. An L2 obstacle indicator signal 11b is calculated therefrom with very high quality and provided. The secure signals 6 from the HMI/RMI 5, the L2 obstacle indicator signal 11b from the fusion unit 10b, and the secure collision notification signal 41 from the perception-safety ECU 40 are again supplied to the motion-control ECU 50 via secure connections.

The modular approach is advantageous in this system: An existing and executable L2 system can be expanded by an "L4 upgrade". As a fallback level in the event of a fault, the L2 system is briefly capable of providing an L2 obstacle indicator signal with a surroundings picture by means of the fusion unit 10b so that the motion-control ECU 50 can transfer the vehicle 70 into a safe state.

While subject matter of the present disclosure has been illustrated and described in detail in the drawings and foregoing description, such illustration and description are to be considered illustrative or exemplary and not restrictive. Any statement made herein characterizing the invention is also to be considered illustrative or exemplary and not restrictive as the invention is defined by the claims. It will be understood that changes and modifications may be made, by those of ordinary skill in the art, within the scope of the following claims, which may include any combination of features from different embodiments described above.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF REFERENCE CHARACTERS

1 System
5 HMI/RMI

6 External control signal
10 Ground truth sensing device
10b Fusion unit
11 Ground truth sensing indicator signal
11b L2 obstacle indicator signal
20 Sensor set
21 Secured radar signal
21b Secured radar signal
22 Unsecured radar signal
23 Camera signal
24 Lidar signal
25 Signal of other sensors
30 High-performance ECU
31 Object recognition indicator signal
32 Output signal of human-machine interface
40 Perception-safety ECU
41 Collision notification signal
50 Motion-control ECU
51 Redundant control signal
52 Redundant control signal
60 Controlled system
70 Vehicle
72 Object
74 Movement path
76 Camera
77 Camera
78 Other Sensor
79 Other Sensor
80 Radar sensor
81 Radar sensor
82 Lidar sensor
84 Display
87 Emergency shut-off switch
88 Remote emergency shut-off switch
90 Drive wheel/brake
92 Drive wheel/brake
94 Steered wheel
96 Steered wheel
98 Secure bus system

The invention claimed is:

1. A system for safely operating an automated vehicle, comprising:
a first network comprising
a sensor set comprising a plurality of sensors configured to detect the surroundings of the vehicle, wherein the sensor set is coupled to a high-performance electronic control unit (ECU) configured to process signals of the sensors for orientation, control, and collision avoidance; and
a secure motion-control ECU redundantly coupled to at least one drive element via at least two control signals for controlling the vehicle,
wherein the high-performance ECU is configured to output an object recognition indicator signal for orientation, control, and collision avoidance to the secure motion-control ECU;
a second, hierarchical, redundant network for safely operating the vehicle, comprising:
a human machine interface (HMI) and/or a remote machine interface (RMI) comprising at least one emergency shut-off switching device;
a ground truth sensing device configured to determine the position of objects relative to the vehicle; and
a perception-safety ECU coupled via a plurality of secure connections to the HMI and/or the RMI, the ground truth sensing device, and at least one radar sensor in order to derive from transmitted signals a secure collision notification signal, which is supplied to the secure motion-control ECU via a first further secure connection; and
wherein the secure motion-control ECU is designed to securely evaluate signals of the HMI and/or the RMI, the ground truth sensing device, and the perception-safety ECU for recognition of an emergency state in order to control the vehicle redundantly into a safe state via at least two control signals in an event of the recognition of the emergency state; and
a human control branch, a level 2 driver assistance perception branch, and a level 4 autonomous driving perception branch,
wherein the human control branch has the HMI and/or the RMI, which is coupled to the perception-safety ECU and the secure motion-control ECU via one of the plurality of secure connections,
wherein the level 2 driver assistance perception branch has the perception-safety ECU and at least one radar sensor and at least one camera, wherein a signal of the radar sensor and a signal of the camera are supplied via a second further secure connection to a secure fusion unit, which outputs a secure fused signal, which is supplied to the perception-safety ECU via one of the plurality of secure connections in order to derive therefrom in the perception-safety ECU a secure collision notification signal, which is supplied to the secure motion-control ECU via the first further secure connection,
wherein the level 4 autonomous driving perception branch has the high-performance ECU, which is coupled to the sensor set and is designed to derive from the signals of the sensors an object recognition indicator signal, which is supplied to the secure motion-control ECU, and
wherein the level 2 driver assistance perception branch is designed to control the vehicle via the secure motion-control ECU into a safe state by means of the secure fused signal in an event of the recognition of the emergency state or of a failure of the level 4 autonomous driving perception branch.

2. The system according to claim 1, wherein the secure motion-control ECU is further respectively coupled via a-one of the plurality of secure connections to the HMI and/or the RMI and to the ground truth sensing device.

3. The system according to claim 1, wherein the HMI and/or the RMI has at least one emergency shut-off switch provided on the vehicle and at least one remotely controlled emergency shut-off switching device.

4. The system according to claim 1, wherein the high-performance ECU is designed to recognize one or more objects in the surroundings of the vehicle from the signals of the sensors, to classify them, to determine positions and movement information of the objects, and to transmit them to the secure motion-control ECU as unsafe object recognition indicator signal, and wherein the secure motion-control ECU is designed to evaluate the object recognition indicator signal and to compare it to the secure collision notification signals of the HMI and/or the RMI, of the ground truth sensing device, and of the perception-safety ECU in order to control the vehicle in accordance with a specified driving task in an event that no emergency state is recognized.

5. The system according to claim 4, wherein the high-performance ECU has an interface configured to output an output signal.

6. The system according to claim 1, wherein the plurality of sensors includes at least one radar sensor, at least one camera sensor, at least one lidar sensor, and an ultrasonic sensor or infrared sensor.

7. The system according to claim 1, wherein the ground truth sensing device has a time-of-flight camera, and/or a lidar system and/or a bumper configured to trigger a signal upon contact with an object.

8. The system according to claim 1, wherein the signal of the ground truth sensing device and/or of the perception-safety ECU and/or of the HMI and/or the RMI and/or of the secure motion-control ECU is transmitted redundantly by wire or in a secured manner via a bus system.

9. The system according to claim 1, wherein the perception-safety ECU is designed as a control device that is controlled with software that evaluates input signals based on rules, without the use of artificial intelligence (AI) algorithms, in order to determine therefrom a secure signal of higher quality with safe position information.

10. The system according to claim 1, in which the signal of the HMI and/or the RMI and the signal of the fusion unit are also supplied via two or more of the plurality of secure connections to the secure motion-control ECU in addition to the signal of the perception-safety ECU.

11. A method for safely operating an automated vehicle, in which
   processing signals of a sensor set, in a first network, comprising a plurality of sensors configured to detect surroundings of the vehicle for orientation, control, and collision avoidance in order to generate an object recognition indicator signal for orientation, control, and collision avoidance, wherein the sensor set is coupled to a high-performance electronic control unit (ECU);
   transmitting the object recognition indicator signal to a secure motion-control ECU, which redundantly safely controls via at least two control signals at least one actuator for controlling the vehicle;
   coupling, in a second, hierarchical, redundant network for safely operating the vehicle, a human machine interface (HMI) and/or a remote-machine interface (RMI) comprising at least one emergency shut-off switching device and a ground truth sensing device for determining a position of objects relative to the vehicle via a plurality of secure connections to a perception-safety ECU in the form of a control device,
   supplying the perception-safety ECU with a signal of at least one radar sensor in order to derive from the transmitted signals a secure collision notification signal, which is supplied to the secure motion-control ECU via a first further secure connection;
   respectively coupling the secure motion-control ECU, via one or more of the plurality of secure connections to the HMI and/or the RMI and to the ground truth sensing device;
   evaluating, by the secure motion-control ECU, the signals of the HMI and/or the RMI, of the ground truth sensing device, and of the perception-safety ECU in order to safely recognize an emergency state in which the vehicle is redundantly controlled into a safe state via at least two control signals;
   coupling a human control branch having the HMI and/or the RMI to the perception-safety ECU and the secure motion-control ECU via one of the plurality of secure connections;
   supplying a signal of at least one radar sensor and at least one camera via a second further secure connection to a secure fusion unit,
     wherein a level 2 driver assistance perception branch has the perception-safety ECU and the at least one radar sensor and the at least one camera, and
     wherein the secure fusion unit outputs a secure fused signal, which his supplied to the perception-safety ECU via one of the plurality of secure connections in order to derive therefrom in the perception-safety ECU a secure collision notification signal, which his supplied to the secure motion-control ECU via the first further secure connection;
   deriving from signals of the sensors an object recognition indicator signal, which is supplied to the secure motion-control ECU,
     wherein a level 4 autonomous driving perception branch has the high-performance ECU, which his coupled to the sensor set and
   controlling the vehicle via the secure motion-control ECU uinto a safe state by the secure fused signal in an event of the recognition of an emergency state or of a failure of the level 4 autonomous driving percepton branch.

12. The system according to claim 11, wherein the secure motion-control ECU is furthermore respectively coupled via a secure connection to the HMI and/or the RMI and to the ground truth sensing device.

13. The method according to claim 11, wherein the high-performance ECU recognizes from the signals of the sensors one or more objects in the surroundings of the vehicle, classifies them, determines positions and movement information of the one or more objects, and transmits them as unsafe object recognition indicator signal to the secure motion-control ECU, and wherein the secure motion-control ECU evaluates the object recognition indicator signal and compares it to the secure signals of the HMI and/or the RMI, of the ground truth sensing device, and of the perception-safety ECU in order to recognize an emergency state, and in order to control the vehicle in accordance with a specified driving task in an event that no emergency state is recognized.

* * * * *